Jan. 26, 1926.   1,571,146
E. L. SCHUMACHER
GOGGLES
Filed Feb. 9, 1924   2 Sheets-Sheet 1

INVENTOR
E. L. Schumacher.
BY
Harry H. Styll.
ATTORNEY

Jan. 26, 1926.
E. L. SCHUMACHER
GOGGLES
Filed Feb. 9, 1924    2 Sheets-Sheet 2
1,571,146
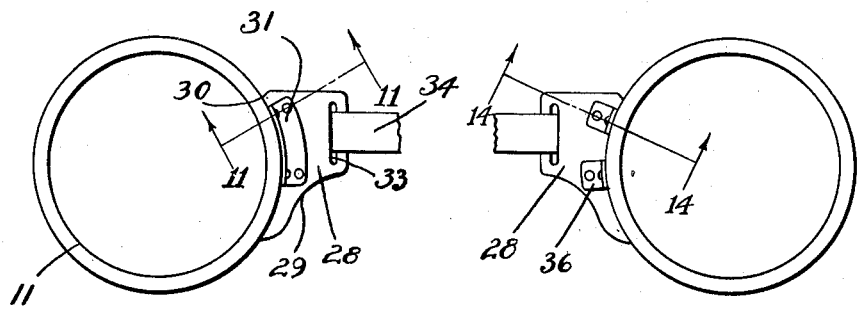
*Fig. 10.*    *Fig. 13.*
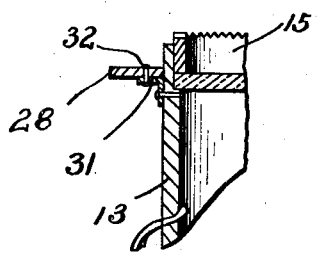   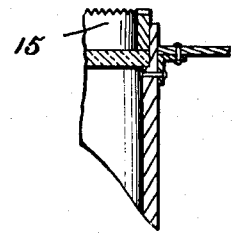
*Fig. 11.*    *Fig. 14.*
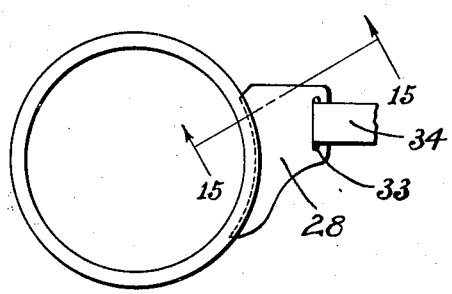   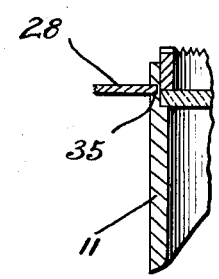
*Fig. 12.*    *Fig. 15.*
INVENTOR
E. L. Schumacher.
BY
Harry H. Styll
ATTORNEY Patented Jan. 26, 1926.

1,571,146

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

GOGGLES.

Application filed February 9, 1924. Serial No. 691,615.

*To all whom it may concern:*

Be it known that I, ELMER L. SCHUMACHER, a citizen of the United States, residing at Southbridge, in the county of Worcester and State of Massachusetts, have invented certain new and useful Improvements in Goggles, of which the following is a specification.

The present invention relates to an improved form of goggle and has particular reference to a goggle wherein the lenses may be interchanged with great rapidity.

A very important object of this invention is to provide a goggle of this nature that will accommodate various numbers and thicknesses of lenses in such a manner that no matter what lens or lenses are used they will be held rigidly in place during use, while at the same time they may be removed in a few seconds and replaced with other lenses.

Another very important object of the invention is to provide a goggle of this nature that will have a lens retaining member or ring that will be so constructed that one of such rings can be interlocked with the other thereof to remove the same if it should become too tight to remove otherwise.

Other objects and advantages of the invention will become apparent during the course of the following description.

In the drawings, wherein like numerals are employed to designate like parts throughout the same:

Figure 10 is a top plan view of a portion of a goggle with the retaining means removed, illustrating one form of bridge connection.

Figure 11 is a section taken on line 11—11 of Figure 10.

Figure 12 is a top plan view of another method of mounting the bridge.

Figure 13 is still another method.

Figure 14 is a section taken on line 14—14 in Figure 13 and looking in the direction of the arrow.

Figure 15 is a section taken on line 15—15 of Figure 12 looking in the direction of the arrows.

Figure 1:
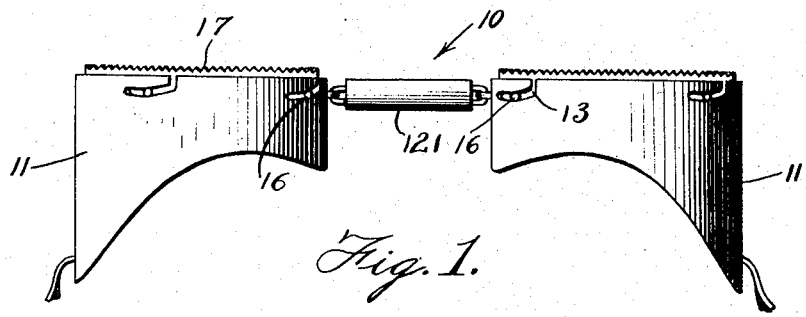
Figure 1 is a side elevation of my improved goggle.

In the drawings, wherein for the purpose of illustration, is shown the preferred embodiment of the present invention, the numeral 10 designates the completed goggles in their entirety.

Figure 2:
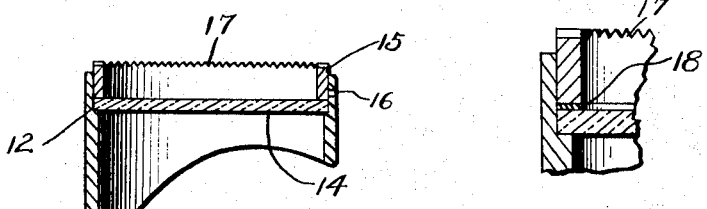
Figure 2 is a vertical transverse section through one portion thereof.

This improved construction comprises the cup members 11 which may be formed from any material such as aluminum, fiber, hardened rubber, etc., and are provided with the shoulder 12 on the interior thereof, as is shown in Figure 2 of the drawings. The cups 11 may be connected by means of the bridge 121 as is shown, although I do not wish to limit myself in any way as to the manner in which the cups 11 are to be connected.

The cups 11 are provided along their outer edges with the bayonet slots 13 which, as is clearly shown in the drawings, have the inclined foot for the purposes that will be more fully explained hereinafter. A lens or lenses 14 are placed within the cup and are adapted to rest upon the shoulder 12 after which the lens retaining member or ring 15 which is provided with the pins 16, is placed within the cup in such a manner that the pins 16 will be arranged within the bayonet slot 13, and due to the fact that the foot of the bayonet slot is inclined as the retaining member 15 is rotated, the pin 16 will travel down the inclined slot, thus firmly tightening or engaging the lens 14 so as to hold it in rigid position between the lower edge of the retaining ring and the shoulder 12. Any number of bayonet slots 13 may be provided, such as three or four, so as to give a good bearing surface and sufficient bearing surface to the pins 16, thereby preventing accidental displacement thereof when in use.

Figure 9:
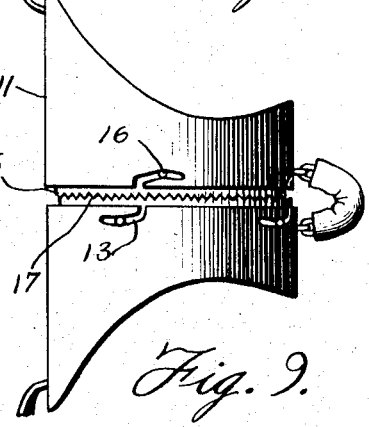
Figure 9 is a side elevation showing one of the retaining members interlocked with the other to facilitate removal thereof.

The retaining ring 15 is provided with the serrations 17, as is shown in Figure 1, the serrations being of such a nature that ordinarily the palm of the hand may be placed thereon, and a twisting movement exerted, whereby the ring will be removed from the cup. However, if the retaining ring does not yield to this pressure one of the cups may be inverted, as is clearly shown in Figure 9, so that the serrations of one retaining ring will mesh or interlock with the serrations of the other retaining ring, thus forming a good wrench that will be capable of removing such a tight fitting ring. In addition to the utility of the serrations they present a very attractive finish for the goggle, as will be clearly seen.

Figure 3:
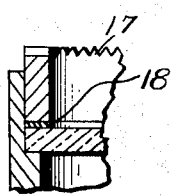
Figure 3 is a fragmentary sectional detail of a portion of the goggle.
Figure 4:
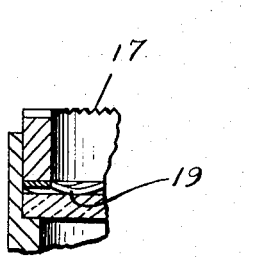
Figure 4 is another fragmentary sectional detail of a slight modification thereof.

As is shown in Figures 3 and 4, a soft washer 18 is disposed between the retaining ring and lens or lenses, so that no undue pressure will be directly exerted on the lens, and to also take up any clearance that may exist. A spring washer 19 may be employed if desired.

Figure 5:
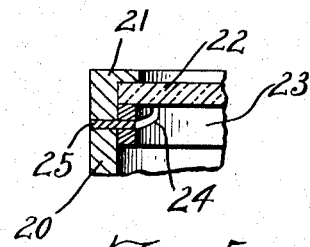
Figure 5 is a section of a slightly different form of goggle.

Instead of having the ring disposed on the top of the lens 14 the lens 14 may be placed within a cup 20 which is provided with an inwardly extending flange 21, such as shown in Figure 5. The cup 20 is inverted and the lens 22 placed therein, after which the retaining ring 23, which has bayonet slots 24 formed therein, is so placed within the cup 20 that the pins 25 will be received in the slots 24 which are slanted so that a twisting movement of the ring 23 will sufficiently tighten the lens against the flange 21 to prevent any rattling or movement thereof while in use.

Figure 6:
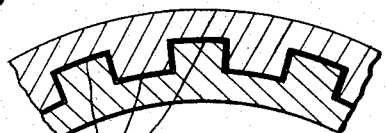
Figure 6 is a longitudinal section through a somewhat slightly modified form of locking means for the retaining ring.
Figure 7:
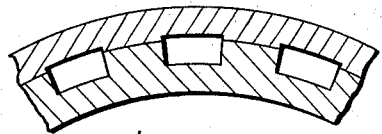
Figure 7 shows the same in an operative position.
Figure 8:
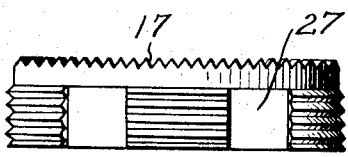
Figure 8 is a side elevation of the retaining member used in this form.

If it is desired to give more friction to the retaining ring as employed in Figure 1, a construction such as shown in Figures 6, 7 and 8 may be used, wherein the cup and retaining rings are both provided with screw threaded portions 26 and the recessed smooth portions 27, whereby the ring may be superimposed upon the cup in such a manner that the thread portions of one member may be disposed within the recessed smooth portion of the other member, after which a slight twist may be given the retaining ring so as to bring the threaded portions of both members into engagement. After this has been done the members will appear from a top view as shown in Figure 7. It will be seen that these threaded portions will give more of a contacting surface and due to this friction accidental displacement will be prevented.

It is to be understood that the form of invention herewith shown and described is to be taken as the preferred embodiment of the same and that various changes in the shape, size and arrangement of parts may be resorted to without departing from the spirit of the invention or the scope of the subjoined claims.

In Figures 1 to 9 the bridge has been shown as being constructed from a length of chain having a suitable covering thereon.

In Figures 10 to 15 inclusive a slightly different form of bridge is shown. In Figure 10 the numeral 28 designates one-half of the bridge and is preferably cut from a piece of flat stock such as fiber, hardened rubber, etc., and has the curved edge 29 to allow the bridge to accommodate itself to the shape of the user's nose, while the edge 30 is so shaped as to conform to the curvature of the cup 11.

As is clearly shown in Figure 11, a slightly arcuated angle member 31 is riveted by means of the rivets 32 to the bridge portion 28 and the cup 11 in such a manner that the bridge will be rigidly associated with the said cup. A suitable slot 33 is provided to receive a strap 34 which is used to connect the two bridge sections of adjacent eye cups.

In Figures 12 and 15 the bridge section 28 is adapted to be received within a suitable slot 35 which is formed in an eye cup 11, after which the said bridge section is cemented in place. The strap 34 is received within the slot 33 as is shown in Figure 10, as well as Figure 12.

In Figures 13 and 14 a plurality of smaller angle irons 36 are used to hold the bridge portion 28 in place, similar to that shown in Figures 10 and 11. It will thus be seen that by attaching the bridges or bridge portions as is shown in these figures that the desired bridge may be had with this form of goggle, while at the same time the amount of material required in the manufacture of this goggle has been greatly reduced as well as the weight thereof.

By constructing a goggle as above set forth I have provided a much lighter and neater goggle that can well be substituted for many of the prior goggles that have been much heavier and bulkier and more expensive to construct. The lenses in this goggle may be quickly and readily removed and replaced by simply removing the retaining ring 15.

Having thus described my invention, I claim:

1. A device of the character described comprising a pair of eye cups, each having a portion to fit the face and a lens rest, a flexible bridge member connecting the eye cups which may be bent so that one eye cup may be placed on the other, and a pair of lens retaining members, one for each eye cup having interengaging means with each other and adapted to clamp the lenses on the lens rests through rotation of the retaining members, said interengaging means being for use to tighten or loosen the retaining members when the cups are placed one on the other through the flexing of the bridge member.

2. A device of the character described, comprising an eye cup having a portion to fit the face, and a lens rest, a lens retaining member adapted to clamp the lens on the lens rest, said lens cup and said retaining member having inter-engaging means adapted to clamp the lens on the lens rest through rotation of the lens retaining member, comprising open slotted portions on the eye cup and retaining member, respectively, and threaded portions between the open portions on the eye cup and retaining member, respectively, whereby the retaining member may be pushed freely into engagement with the eye cup at substantially the holding position on the lens, and thereafter locked through a partial rotation of the retaining member in the eye cup engaging the threaded portions of the two members.

3. A device of the character described, comprising an eye cup having a portion to fit the face, and a lens rest, a lens retaining member adapted to clamp the lens on the lens rest, said lens cup and said retaining member having inter-engaging means adapted to clamp the lens on the lens rest through rotation of the lens retaining member, comprising open slotted portions on the eye cup and retaining member, respectively, threaded portions between the open portions on the eye cup and retaining member, respectively, whereby the retaining member may be pushed freely into engagement with the eye cup at substantially the holding position on the lens, and thereafter locked through a partial rotation of the retaining member in the eye cup engaging the threaded portions of the two members, and a yielding washer member between the retaining member and the lens.

ELMER L. SCHUMACHER.